(12) United States Patent
Maaza et al.

(10) Patent No.: US 12,162,076 B2
(45) Date of Patent: Dec. 10, 2024

(54) METHOD OF MANUFACTURING A NANOFLUID AND A SYSTEM USED IN THE MANUFACTURING OF THE NANOFLUID

(71) Applicant: UNIVERSITY OF SOUTH AFRICA, Pretoria (ZA)

(72) Inventors: Malek Maaza, Cape Town (ZA); Touria Khamliche, Cape Town (ZA)

(73) Assignee: University of South Africa, Pretoria (ZA)

( * ) Notice: Subject to any disclaimer, the term of this patent is extended or adjusted under 35 U.S.C. 154(b) by 58 days.

(21) Appl. No.: 17/554,697

(22) Filed: Dec. 17, 2021

(65) Prior Publication Data
US 2022/0105566 A1   Apr. 7, 2022

Related U.S. Application Data

(63) Continuation of application No. PCT/ZA2020/050033, filed on Jun. 15, 2020.

(30) Foreign Application Priority Data

Jun. 20, 2019   (ZA) .................................. 2019/03990

(51) Int. Cl.
| | |
|---|---|
| *B01J 19/08* | (2006.01) |
| *B01J 19/06* | (2006.01) |
| *B22F 9/16* | (2006.01) |
| *G21G 1/12* | (2006.01) |

(52) U.S. Cl.
CPC .............. *B22F 9/16* (2013.01); *B01J 19/06* (2013.01); *B01J 19/082* (2013.01); *G21G 1/12* (2013.01); *B01J 2219/0877* (2013.01); *B01J 2219/1203* (2013.01); *B22F 2301/255* (2013.01)

(58) Field of Classification Search
None
See application file for complete search history.

(56) References Cited

U.S. PATENT DOCUMENTS

| | | | | |
|---|---|---|---|---|
| 3,446,962 A | * | 5/1969 | Egbert | G21K 1/12 |
| | | | | 378/3 |
| 4,066,907 A | * | 1/1978 | Tetzlaff | G21K 5/10 |
| | | | | 976/DIG. 444 |
| 4,845,747 A | * | 7/1989 | Koike | A61B 6/505 |
| | | | | 378/208 |

(Continued)

FOREIGN PATENT DOCUMENTS

EP   0128922 B1   *   10/1989

OTHER PUBLICATIONS

International Search Report issued by the European Patent Office for International Patent Application No. PCT/ZA2020/050033, mailed on Sep. 23, 2020.

(Continued)

*Primary Examiner* — George Wyszomierski
(74) *Attorney, Agent, or Firm* — Myers Wolin, LLC (57) ABSTRACT

A nanofluid manufactured by nuclear irradiating a mixture that comprises a precursor and a base fluid, a method of manufacturing the nanofluid, and a system for use in manufacturing the nanofluid. The combination of the uniform irradiation dosage results in substantially no sedimentation of the suspended nanoparticles. The formed nanofluid has been observed to have better properties compared to those known in the art.

3 Claims, 8 Drawing Sheets

(56) References Cited

U.S. PATENT DOCUMENTS

| | | | | |
|---|---|---|---|---|
| 6,002,734 | A | * | 12/1999 | Steinman ................. G21K 5/10 |
| | | | | 376/157 |
| 6,221,275 | B1 | | 4/2001 | Choi et al. |
| 2004/0147618 | A1 | | 7/2004 | Lee et al. |
| 2004/0223870 | A1 | * | 11/2004 | Herer ....................... G21K 5/10 |
| | | | | 250/455.11 |
| 2008/0277844 | A1 | * | 11/2008 | Chai ......................... C22B 5/02 |
| | | | | 266/275 |
| 2018/0240561 | A1 | | 8/2018 | Giraldo et al. |
| 2021/0033980 | A1 | * | 2/2021 | Chou ................. G03F 7/70075 |

OTHER PUBLICATIONS

Shahriari et al., "Characterization of thermal diffusivity and optical properties of Ag nanoparticles", ScienceDirect, Optik—International Journal for Light and Electron Optics, Oct. 2015, pp. 2104-2107, vol. 126, Issue 19, Elsevier GmbH.

\* cited by examiner

METHOD OF MANUFACTURING A NANOFLUID AND A SYSTEM USED IN THE MANUFACTURING OF THE NANOFLUID

CROSS REFERENCE TO RELATED APPLICATIONS

This application is a continuation of International Application No.: PCT/ZA2020/050033, filed on Jun. 15, 2020, which claims priority from South African Patent Application No. 2019/03990, filed on Jun. 20, 2019, the contents of each of which are incorporated herewith by reference.

FIELD OF INVENTION

This invention is in the field of nanofluids and methods of making nanofluids.

BACKGROUND OF INVENTION

Fluids with suspended nanoparticles, commonly known as nanofluids, are gaining a global interest both from scientific & industrial point of views. These nanofluids are formulated, for example, to improve the thermal performance of industrial heat transfer systems. Nanofluids exhibit superior thermal properties such as enhanced thermal conductivity, viscosity, heat transfer coefficient, dielectric strength, etc. However, stability problems may arise as nanoparticles usually have the tendency to agglomerate and sediment producing deterioration in the increment of these properties especially in those made via the common techniques widely published in the art.

It is accordingly the object of the present invention to provide an improved method of making nanofluids which have better physical and chemical properties and an improved stability, than those known in the art.

SUMMARY

According to a first aspect of the invention, there is provided a method of making a nanofluid, the method comprising nuclear irradiating a mixture of a base fluid and precursor to form the nanofluid.

In an embodiment, the method may comprise rotating the mixture and nuclear irradiating beam rays relative to each other, preferably rotating the mixture relative to the nuclear irradiation beams so as to uniformly irradiate the mixture and prevent agglomeration of nanoparticles formed during radiolysis of the precursor.

In an embodiment, the base fluid may either be water or an organic solvent, such as glycol, preferably ethylene glycol.

In an embodiment, the precursor may be a metallic salt selected from one of a copper salt or silver salt, or the combination thereof.

In an embodiment, the nuclear irradiation may be from Gamma rays.

According to a second aspect of the invention, there is provided a system for making nanofluids, the system comprising:

a container for containing a mixture of a precursor and a base fluid;

a nuclear irradiator in communication with the container for emitting nuclear rays arranged to irradiate the mixture held in the container for facilitating radiolysis of the mixture into forming the nanofluid.

In an embodiment, the nuclear irradiator may be a $^{60}$Cobalt Gamma ray emitter arranged to emit about 1 KG rays.

In an embodiment, the system may comprise a rotatable platform or turntable arranged to rotate the container during irradiation.

In an embodiment, the base fluid may either be water or an organic solvent such as glycol, preferably ethylene glycol.

In an embodiment, the precursor may be a metallic salt selected from one of a copper salt or silver salt, or any other suitable metallic salt, or the combination thereof.

According to a third aspect of the invention there is provided a nanofluid comprising nanoparticles formed from nuclear irradiation of a mixture of a precursor and base fluid.

In an embodiment, the base fluid may either be water or an organic solvent such as glycol, preferably ethylene glycol.

In an embodiment, the precursor may be a metallic salt selected from one of a copper salt, silver salt, or any other suitable metallic salt, or the combination thereof.

According to a fourth aspect of the invention, there is provided a nanofluid produced in accordance with the method of the first aspect of the invention.

BRIEF DESCRIPTION OF THE DRAWINGS

The objects and features of the present invention will become fully apparent from following the description taken in conjunction with the accompanying drawings. Undertaking that these drawings depict only typical embodiments of the invention and are therefore, not to be considered limiting its scope, the invention will be described and explained with additional specific and detail through the use of the accompanying drawings in which.

DETAILED DESCRIPTION OF THE PREFERRED EMBODIMENTS

While various inventive aspects, concepts and features of the invention may be described and illustrated herein as embodied in combination in the exemplary embodiments, these various aspects, concepts and features may be used in many alternative embodiments, either individually or in various combinations and sub-combinations thereof. Unless expressly exclude herein all such combinations and subcombinations are intended to be within the scope of the present invention. Still further, while various alternative embodiments as to the various aspects, concepts and features of the invention—such alternative structures, configurations, methods, devices and components, alternatives as to form, fit and function, and so on—may be described herein, such descriptions are not intended to be a complete or exhaustive list of available alternative embodiments, whether presently known or later developed.

Those skilled in the art may readily adopt one or more of the inventive aspects, concepts of features into additional embodiments and uses within the scope of the present invention even if such embodiments are not expressly disclosed herein. Still further, exemplary or representative values and ranges may be included to assist in understanding the present disclosure: however, such values and ranges are not to be construed in a limiting sense and are intended to be critical values or ranges only if so expressly, stated. Moreover, while various aspects, features and concepts may be expressly identified herein as being inventive or forming part of an invention, such identification is not intended to be exclusive but rather there may be inventive aspects, concepts and features that are fully described herein without being expressly identified as such or as part of a specific invention.

Figure 1:
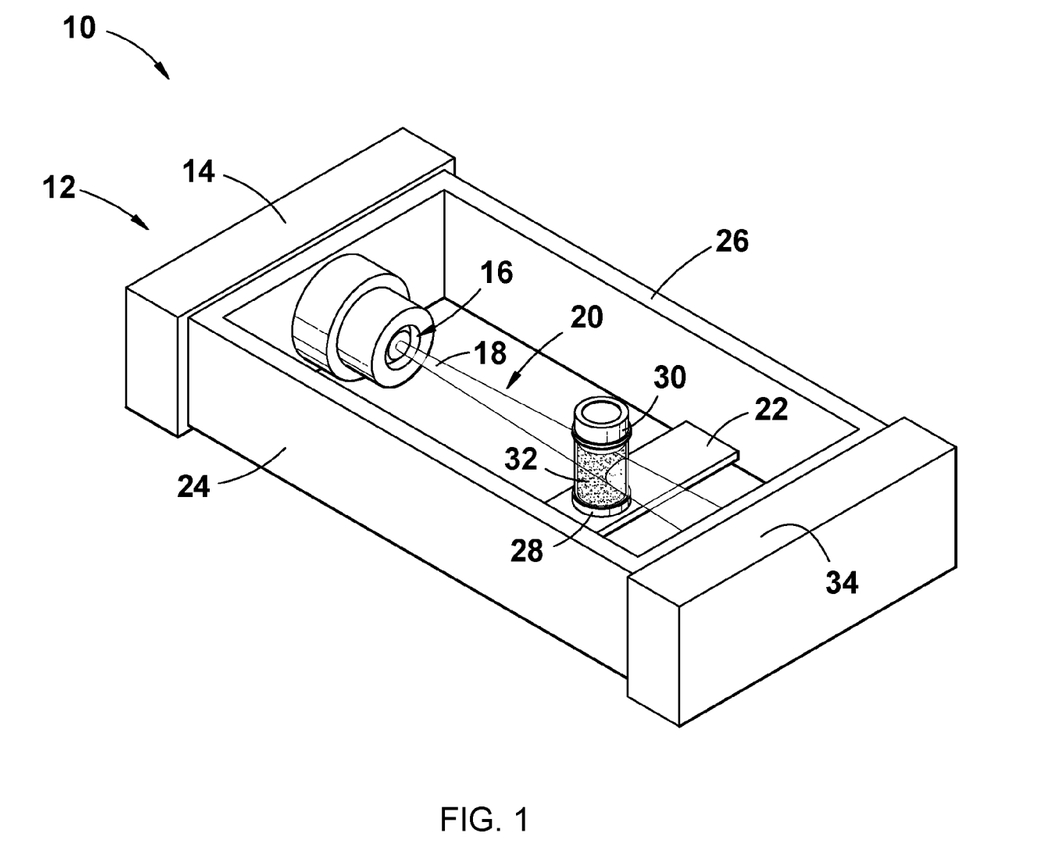
FIG. 1 shows a system for use in making nanofluids.

As can be seen in FIG. 1 of the drawings, there is provided a system 10 for making nanofluids. The system 10 comprises a frame 12 having a first end wall 14 defining an opening through which a gamma ray emitter 16, in particular a $^{60}$Co gamma ray emitter extends inwardly, for emitting gamma rays 18 along a beam path 20. The system 10 comprises a bridge 22 fixed between opposite elongate side walls 24, 26. A turntable 28 is fitted to the bridge 22. The system 10 further comprises a container 30, typically a transparent container, for containing a mixture 32 of a base fluid, such as water or ethylene glycol (EG), and a predefined quantity of a precursor, wherein the precursor may be a salt (e.g. nitrate, acetate, chloride, sulfate, etc.) of, for example, Silver (Ag), Gold (Au), or Copper (Cu). The system 10 further comprises a second end wall 34 which is arranged opposite to the first end wall 14. The opposite side walls 24, 26 and second end wall 34 define an enclosure for shielding the environment surrounding the frame from the gamma rays.

In use, the said mixture 32 is provided in the container 30. The container 30 operatively faces the gamma ray emitter so that the beam path 20 of the gamma rays 18 can extend through the mixture 32. The dosage of gamma rays 18 arranged to irradiate the mixture 32 can be predefined depending on the concentration of the precursor in the base fluid, for example a small dosage of about 0.95 KG ray may be emitted by the emitter 18. The turntable 28 is automatically rotated by the system 10 (e.g. a motor (not shown) which is arranged to rotate the turntable) at a predefined rotational speed to ensure that the mixture is uniformly irradiated so as to facilitate the disassociation or radiolysis of the precursor salt (by means of the nuclear rays, i.e. gamma rays) into undissolved metallic nanoparticles which are suspended in the base fluid combined with the rest of the elements/compounds disassociated from the salt. The rotation of the container 30 ensures that the mixture 32 is uniformly irradiated, typically by exposing all sides of the mixture 32 to the same amount of irradiation dosage, for example by rotating the mixture relative to the direction of travel of the beam path 20 of the gamma rays 18. The rotation of the container 30 further prevents the agglomeration of the nanoparticles formed during the radiolysis process and allows the mixture to mix and continuously cycle from side to side and up and down or vice versa.

Figure 2:
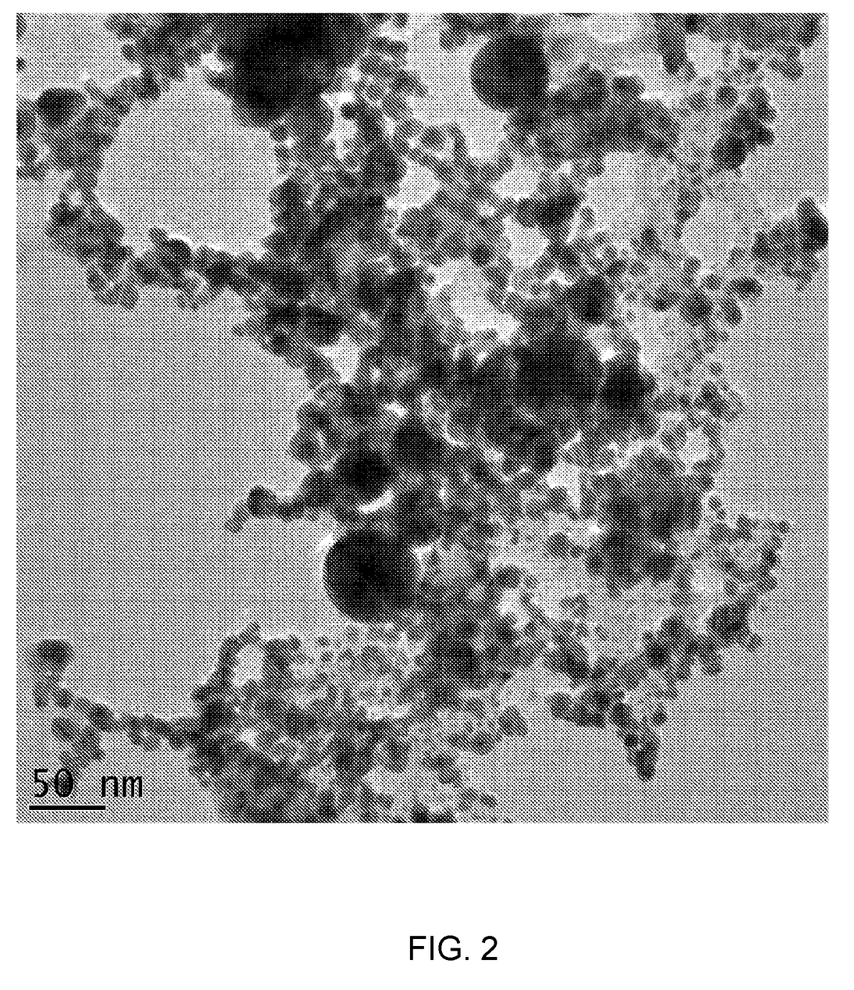
FIG. 2 shows transmission electron microscopy of the nano-scaled Ag particles synthesized by radiolytic process of AgNO$_3$ in EG or H$_2$O.

FIG. 2 shows Transmission electron microscopy of the nano-scaled Ag particles synthesized by radiolytic process of AgNO$_3$ in EG or water (H$_2$O). The size of Ag nanoparticles is smaller than 100 nm. The obtained population of the nano-Ag is generally polydisperse. In this typical case, the size fluctuates within 3 nm-7 nm. The nano-Ag are not exceedingly agglomerated yet have a tendency to form a network of Nano-Ag chains. Such a geometry is expected to be in favor of a better thermal conductivity within the host base fluid (i.e. liquid). It is noticed that such an agglomeration disappears upon ultrasonication or when the nanofluid is heated slightly.

Figure 3:
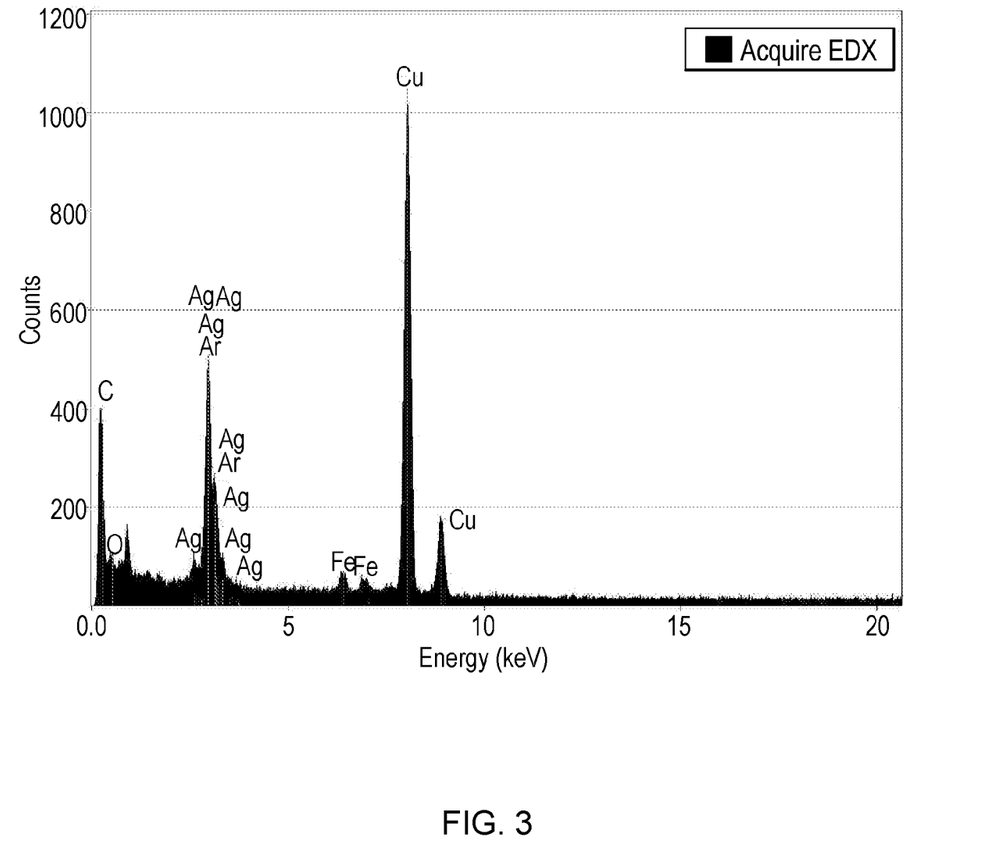
FIG. 3 shows electron dispersion elemental analysis of the nano-scaled Ag particles synthesized by radiolytic process of AgNO$_3$ in EG or H$_2$O.

FIG. 3 shows electron dispersive spectroscopy elemental analysis of the nano-scaled Ag particles synthesized by radiolytic process of AgNO$_3$ in ethylene glycol or water. The observed Carbon at low channel is related to the Carbon coating used to minimize the Fe charge accumulation. Likewise, the Cu peaks originate from the Cu carbon coated used as a substrate for the Electron Microscopy characterization. The Fe peaks are due to impurities of the initial used AgNO$_3$ precursor. Since Fe and Ag are not miscible, it is likely the Fe contamination consists of Fe cluster or significantly small Fe or Fe oxide nanoparticles.

Figure 4:
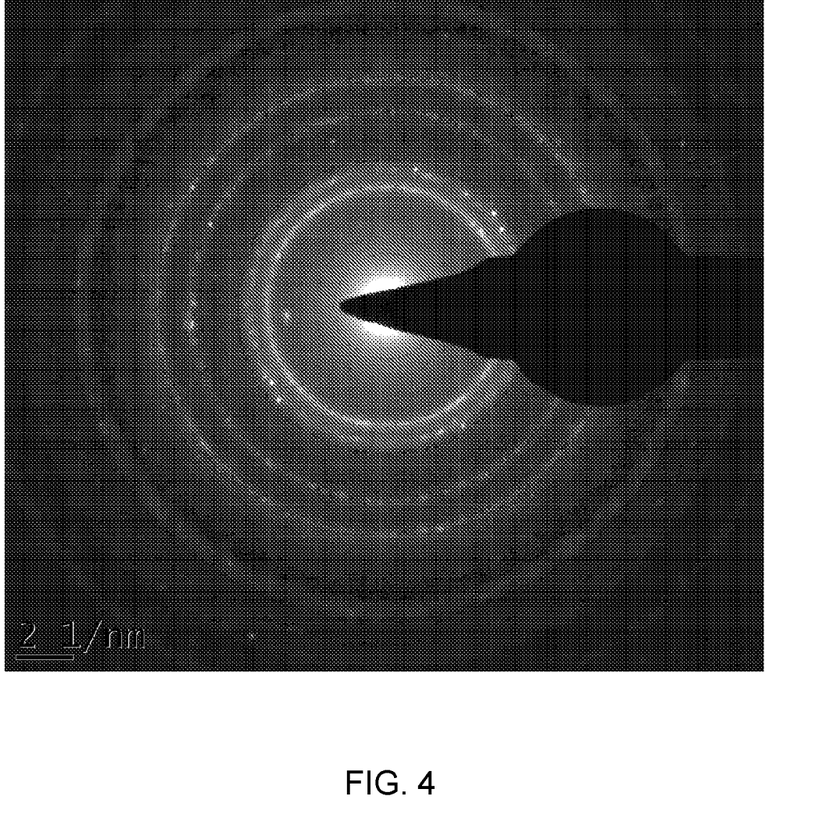
FIG. 4 shows a selected area electron diffraction of the nano-scaled Ag particles synthesized by radiolytic process of AgNO$_3$ in EG or H$_2$O.

FIG. 4 shows a Selected Area Electron diffraction of the nano-scaled Ag particles synthesized by radiolytic process of AgNO$_3$ in EG or H$_2$O. The annular and spot diffraction pattern sustain the polycrystallinity of the Ag nanoparticles. The first annular rings correspond to the (111), (200) and (220) Ag Bragg diffraction.

Figure 5:
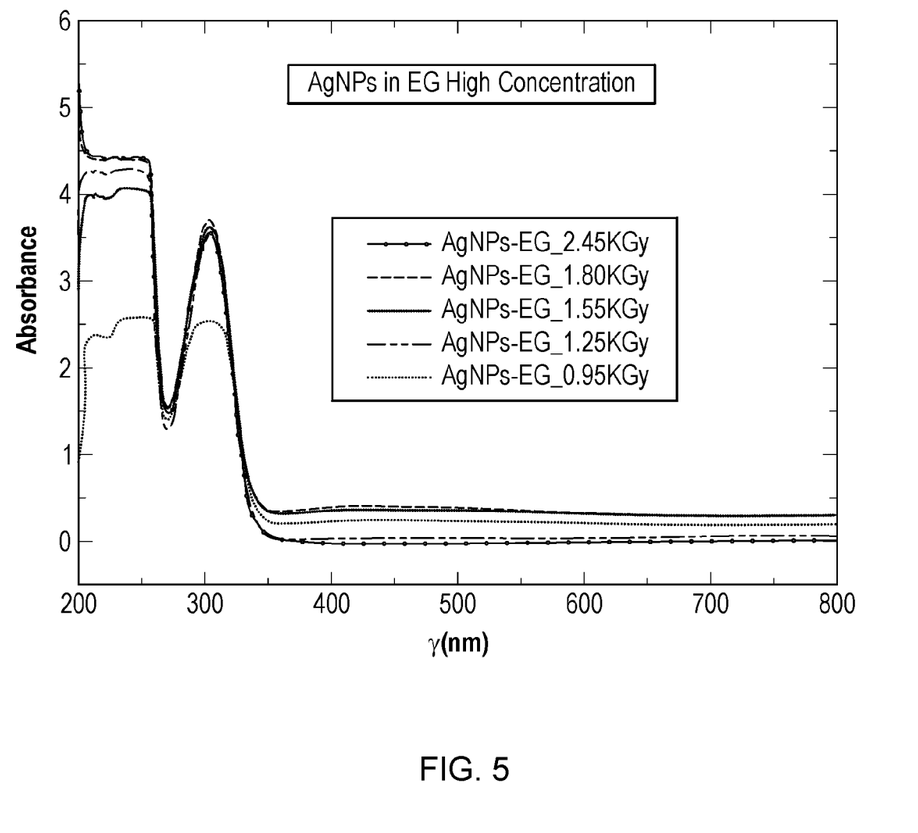
FIG. 5 shows absorbance spectra of the nano-scaled Ag suspensions synthesized by radiolytic process of AgNO$_3$ in H$_2$O at different gamma doses.

FIG. 5 shows absorbance spectra of the nano-scaled Ag suspensions synthesized by radiolytic process of AgNO$_3$ in H$_2$O at different gamma doses. The intrinsic plasmon peaks is observed for various gamma doses both for High (5-a) & high (5-b) doses. In this representative Plasmonic signature of the nanoparticles of Ag suspension in EG for doses varying from 0.95 KGrays to 2.45 KGrays. Even at low dose of 0.95 KGrays, one can distinguish the characteristic nanoAg plasmon peak. In addition, the width at half maximum of the Plasmon peak is constant suggesting no significant change in the size of the Ag nanoparticles with the dose yet polydisperse as per highlighted in FIG. 2.

Figure 6:
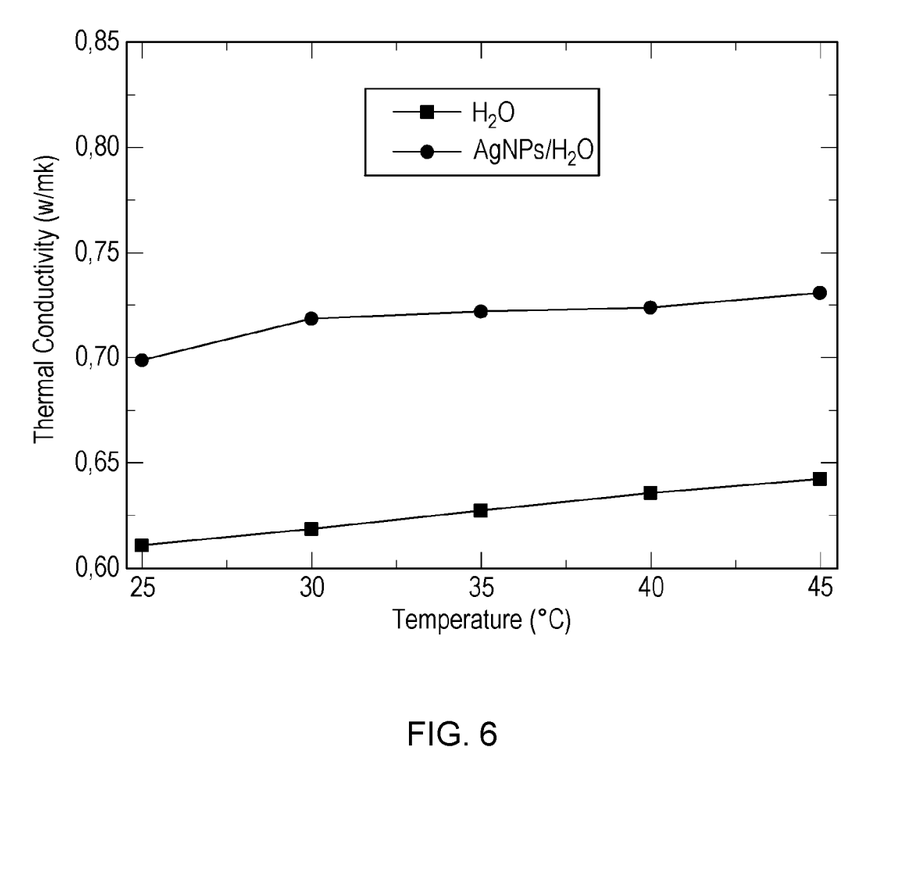
FIG. 6 shows thermal conductivity of the Ag Nanosuspensions in H$_2$O measured by Pt wire standard technique, showing a relative enhancement of 16% to pure H$_2$O.

FIG. 6 shows thermal conductivity of the Ag nanosuspensions in H$_2$O measured by Pt wire standard technique, showing a relative enhancement of 16% to pure H$_2$O.

Figure 7:
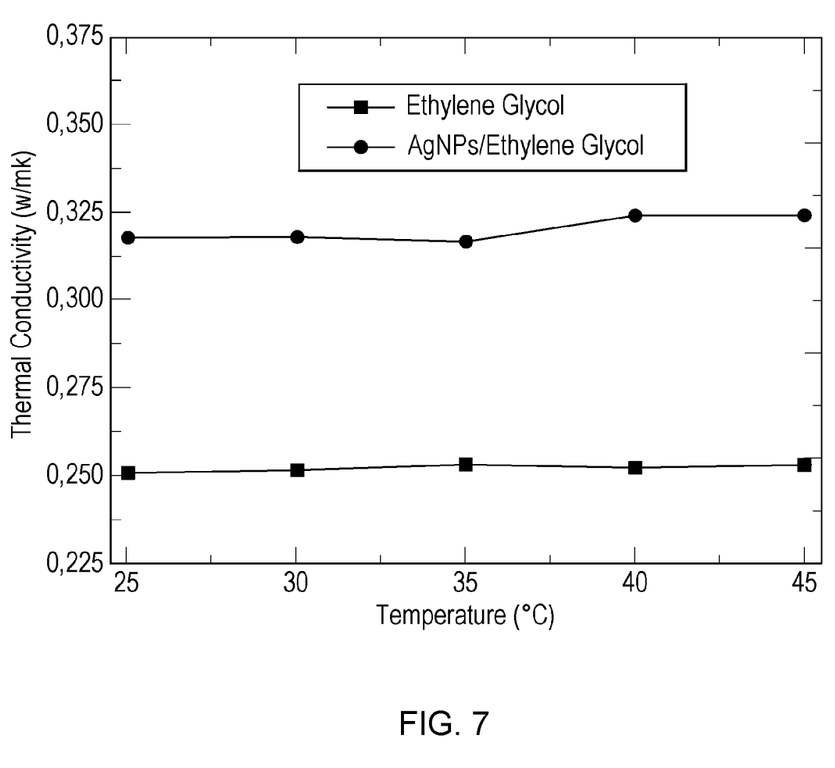
FIG. 7 shows thermal conductivity of the Ag Nanosuspensions in EG measured by Pt wire standard technique, showing a relative enhancement of 30% compared to pure EG.

FIG. 7 shows thermal conductivity of the Ag Nanosuspensions in EG measured by Pt wire standard technique, showing a relative enhancement of 30% compared to pure EG.

Figure 8:
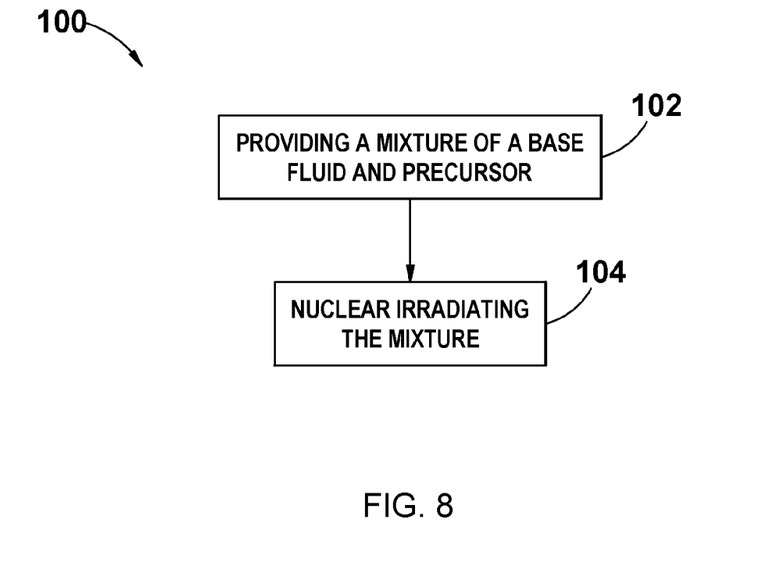
FIG. 8 shows a high-level block diagram showing a method of making a nanofluid.

As shown in FIG. 8, there is provided a high-level block diagram showing a method 100 of making a nanofluid. The method 100 comprises providing a mixture of a precursor (for example a salt of Ag such as AgNO$_3$) in a base fluid such as water or EG 102. The method 100 further comprises nuclear irradiating the mixture with nuclear rays, such as gamma rays, 104 to facilitate radiolysis of the precursor (AgNO$_3$) into suspended, undissolved solid particles (Ag particles) and dissolved matter (such as NO$_3$) which enter the base fluid, and which, together with the undissolved solid particles form a nanofluid in accordance with the invention. The method 100 further comprises uniformly irradiating the mixture, typically by exposing all sides, i.e. the entire body of the mixture to the same amount of irradiation dosage, for example by rotating the mixture relative to the direction of travel of the beam path of the gamma rays.

The Applicant has observed that the combination of the uniform irradiation dosage results in substantially no sedimentation of the suspended nanoparticles. The formed nanofluid has been observed to have better properties compared to those known in the art.

The invention claimed is:

1. A system for use in the manufacture of a nanofluid, the system comprising:

a frame having a first end wall defining;

an opening through which a gamma ray emitter extends inwardly for emitting gamma rays along a beam path;

a bridge fixed between opposite elongate side walls;

a container for containing a mixture of a precursor of metallic nanoparticles and a base fluid;

a gamma rays irradiator facing a side of the container for emitting gamma rays through the container;

a second end wall which is arranged opposite to the first end wall, wherein the opposite side walls and the second end wall define an enclosure for shielding the environment surrounding the frame from the gamma rays; and a rotatable platform or turntable, fitted to the bridge, supporting the container such that the rotational axis of the container is arranged substantially perpendicular to the direction of travel of the gamma rays arranged to be emitted by the gamma rays irradiator, the rotatable platform being arranged to rotate the container during irradiation such that mixture held in the container is rotated relative to the gamma radiation beam rays thus substantially uniformly irradiating the mixture.

2. The system according to claim 1, wherein the base fluid is selected from one of a water or an organic solvent.

3. The system according to claim 1, wherein the precursor consists of is a metallic salt or a combination of metallic salts.

* * * * *